May 6, 1958 T. K. COX 2,832,993
APPARATUS FOR EXTRUDING AND COOLING PLASTICS
Filed May 13, 1952 2 Sheets-Sheet 1
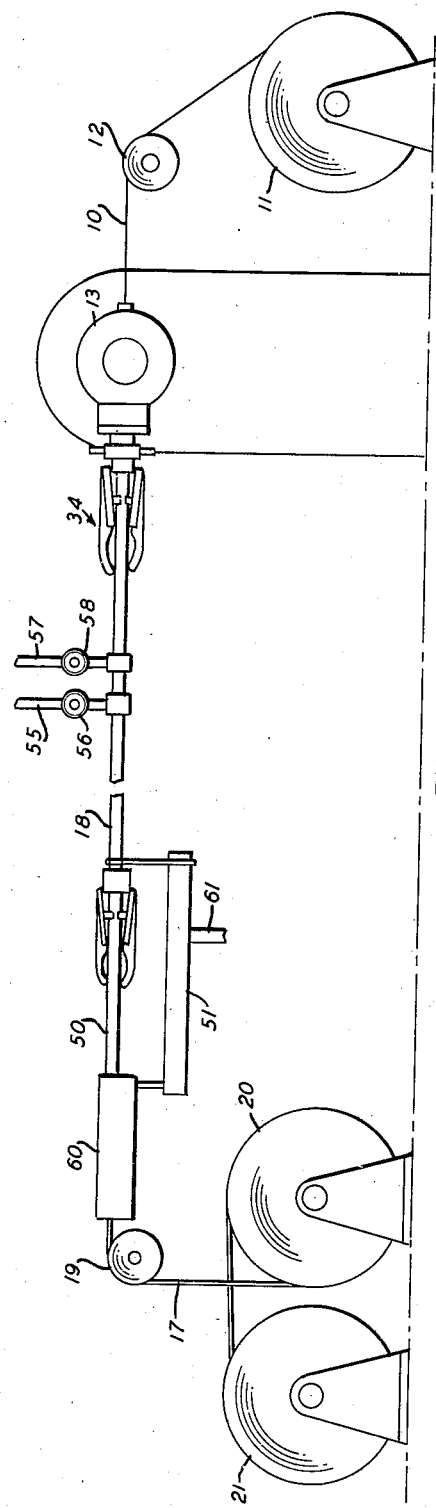
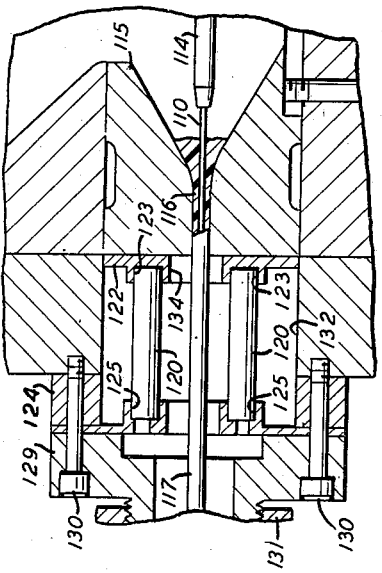
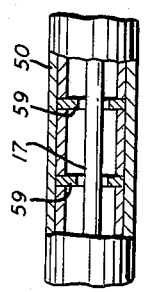
INVENTOR
T. K. COX
BY
ATTORNEY May 6, 1958  T. K. COX  2,832,993
APPARATUS FOR EXTRUDING AND COOLING PLASTICS
Filed May 13, 1952  2 Sheets-Sheet 2

INVENTOR
T. K. COX
BY
ATTORNEY

United States Patent Office 2,832,993
Patented May 6, 1958

2,832,993

APPARATUS FOR EXTRUDING AND COOLING PLASTICS

Thomas K. Cox, Randallstown, Md., assignor to Western Electric Company, Incorporated, New York, N. Y., a corporation of New York Application May 13, 1952, Serial No. 287,475

4 Claims. (Cl. 18—6)

This invention relates to apparatus for extruding and cooling plastics, and more particularly to apparatus for extruding articles composed of plastic compounds and cooling them as they issue from an extrusion die.

In the manufacture of insulated electrical conductors, a thin sheath of a plastic insulating compound, such as polyvinyl chloride, may be extruded about a moving conductive core that is being advanced at a high rate of speed. This compound may include minor amounts of such ingredients as fillers, plasticizers, stabilizers, lubricants, and pigments. Some of these ingredients may decompose and generate gas under the heat of extrusion, and they may also occlude a small amount of gas at the time they are introduced into the extruder. All of these gases may be released when the insulated conductor issues from the extrusion die, and because of the abrupt drop in pressure at this point they may expand and cause small bubbles to appear in the extruded insulating sheath. Such expansion may occur readily when the insulation is soft and hot, and when the insulation cools these bubbles will remain trapped therein and constitute a defect. In order to control the expansion of the bubbles, the extruded insulation may be cooled immediately after it issues from the extrusion die. The use of a row of sprinklers or an elongated trough to apply a cooling fluid to the hot sheath may limit the expansion of the bubbles somewhat, but undesirable bubbles may nevertheless be found to remain.

An object of the invention is to provide new and improved apparatus for extruding and cooling plastics.

Another object of the invention is to provide new and improved apparatus for extruding articles composed of plastic compounds and cooling them as they issue from an extrusion die.

An apparatus illustrating certain features of the invention may include an extrusion die, means for forcing a plastic compound through the die to form a shaped article, means for maintaining a body of cooling fluid at the exit end of the die so that the article may be advanced through and be cooled by the fluid, and means for heating the exit end of the die to prevent the fluid from cooling the die to a temperature at which smooth extrusion cannot be obtained.

A complete understanding of the invention may be obtained from the following detailed description of an apparatus forming specific embodiments thereof, when read in conjunction with the appended drawings, in which Fig. 1 is a side elevation view of apparatus forming one embodiment of the invention;

Fig. 3 is an enlarged elevation of a portion of the apparatus shown in Fig. 1, with portions broken away to show the interior, and Fig. 4 is a fragmentary, vertical section of apparatus forming a second embodiment of the invention.

Figure 2:
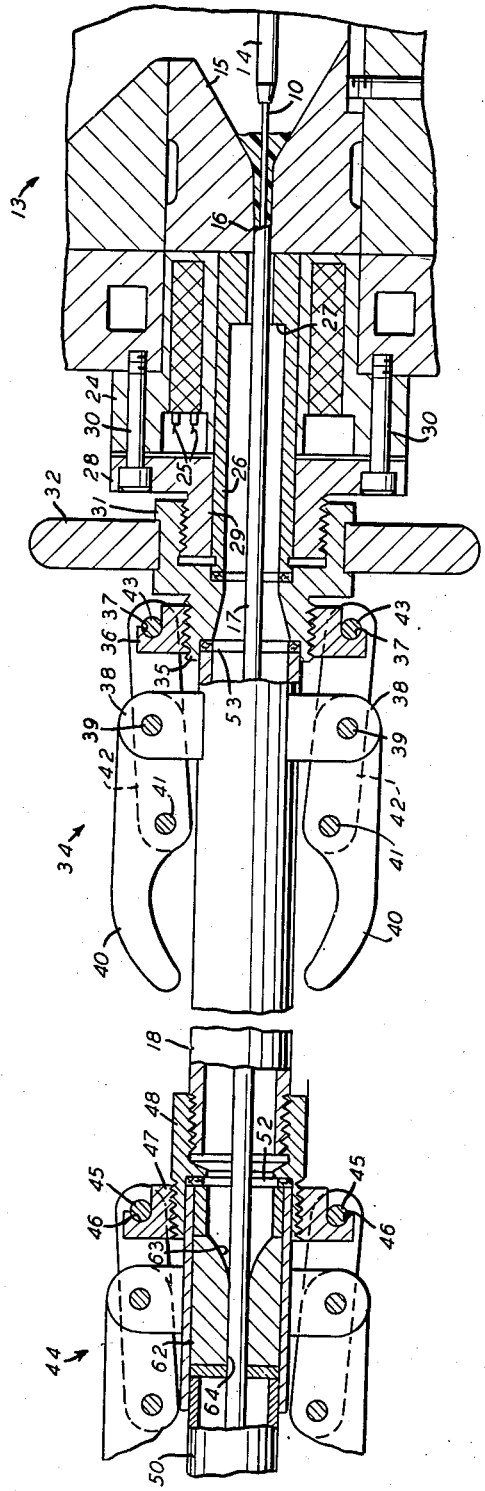
Fig. 2 is an enlarged, fragmentary, vertical section of a portion of the apparatus illustrated in Fig. 1.

Referring now in detail to the drawings, a filamentary conductive core 10, such as a copper wire, may be withdrawn from a supply reel 11, be guided by a directional sheave 12, and thence be drawn through a conventional extruder 13. As shown in Fig. 2, the extruder 13 includes a core tube 14 for guiding the core 10 axially through a die 15 in which a mass of heated plastic material, such as a polyvinyl chloride compound, is shaped about the core into a concentric insulating sheath 16. The product which thereby continuously issues from the exit end of the extrusion die 15, is a plastic covered conductor 17.

At the time it issues from the exit end of the die 15, the plastic sheath 16 of the covered conductor 17 is hot and soft, and while in this condition it must not be physically contacted lest marring or deformation thereof occur. In accordance with one feature of the invention, cooling of the sheath 16 is accomplished by passing the covered conductor 17 through an elongated tube 18 which contains a cooling fluid, such as water, maintained under a relatively high pressure. The tube 18 is positioned directly adjacent to the exit end of the die 15, so that cooling of the sheath may occur immediately after the hot sheath leaves the die. By the time the advancing conductor 17 reaches the exit end of the tube 18, its sheath 16 is cool and hard, so that it may be engaged without danger of injuring its shape or surface. The covered conductor 17 may then be advanced around a directional sheave 19 and a power driven capstan 20, and be coiled up on a takeup reel 21.

It has been found that if the tube 18 is secured directly to the exit end of the die 15, the cold water in the tube 18 tends to chill the die, causing the surface of the extruded product to appear quite coarse. Another effect that may be caused by such chilling is a lack of concentricity in a plastic covered conductor. Therefore, in accordance with another important feature of the invention, a heating unit 24 is secured directly to the exit end of the die 15. The heating unit 24 may include a plurality of wire coils 25—25 which may be heated by passing an electric current therethrough. Alternatively, the exit end of the die 15 could be heated by means of a steam coil, or by any other suitable means.

In the case of a polyvinyl chloride compound, an optimum temperature for the mass of plastic material passing through the die is about 350° F., and below this temperature the surface of the extruded product does not appear smooth. The use of the heating unit 24 prevents cooling of the die to the point where smooth extrusion cannot be obtained, and prevents this cooling effect from causing a lack of concentricity in a sheathed product.

Although the heating unit 24 could be placed directly within the cooling fluid that is maintained under pressure at the exit end of the die 15, it is preferred to separate the fluid from the heating unit by means of a tubular sleeve 26, which abuts the exit end of the die 15 and is concentric with but spaced from the covered conductor 17 issuing from the die. The end of the sleeve 26 that abuts the die 15 is provided with a restricted portion 27 to reduce the area of the die that may be contacted by the cool water. The heating unit 24 may be annular in configuration and it may be retained in an abutting position against the die 15 by means of a flange 28 on a coupling 29, which may be secured to the extruder 13 by means of a plurality of bolts 30—30. The coupling 29 concentrically surrounds a portion of the sleeve 26 and it is provided with an exteriorly threaded portion which may be engaged by an interiorly threaded portion of an adapter 31. The adapter 31 is provided with a hand wheel 32 which an operator may use to screw the coupling 29 and the adapter 31 together.

The elongated tube 18 may be joined to the adapter 31 by means of a quickly releasable clamp 34 of a well-known type. The adapter 31 is provided with an exteriorly threaded extension 35, which may be engaged by inner threads on a collar 36 having a pair of notches 37—37 in its outer periphery. A pair of lugs 38—38 welded to the end of the tube 18 are provided with a pair of pins 39—39 carrying a pair of hand grips 40—40. At one of their ends the hand grips 40—40 are pivotally mounted upon the pins 39—39, and at their midpoints these hand grips are provided with a pair of pins 41—41. One end of a pair of levers 42—42 are pivotally mounted upon the pins 41—41, and the other end of this pair of levers carries a pair of pins 43—43, which may be snapped into the notches 37—37 on the collar 35. Thus, when both of the hand grips 40—40 are pivotally moved away from the tube 18, the levers 42—42 will be moved upwardly and towards the adapter 31, causing the pins 43—43 to be moved out of the notches 37—37, thereby quickly detaching this end of the tube 18 from the adapter 31.

The other end of the tube 18 may be quickly attached to and detached from the ensuing portions of the apparatus by means of a clamp 44, which is identical in construction and in operation with the quickly releasable clamp 34. The clamp 44 includes a pair of pins 45—45 which may be snapped into and out of a pair of notches 46—46 provided in the outer periphery of a collar 47. An annular coupling 48 is provided with an interiorly threaded portion that is screwed onto the end of the tube 18, and this coupling is also provided with an exteriorly threaded portion which engages an inner threaded portion of the collar 47. The clamp 44 is welded to the exterior of a stationary pipe 50 which is supported above an overflow trough 51. A gasket 52 is positioned between the pipe 50 and the one end of the tube 18, and another gasket 53 is positioned between the adapter 31 and the other end of the tube 18. By suitably operating the hand wheel 32 to adjust the position of the adapter 31, and by releasing the clamps 34 and 44, the tube 18 can be readily removed from the apparatus.

Cold water may be introduced into the tube 18 from a supply pipe 55 by means of a valve 56. In case this water is too cold, warm water may be admitted from an adjacent supply pipe 57 by means of a valve 58. The water pressure maintained in the tube 18 may be varied as needed, and it may be as high as 60 p. s. i. This pressure is also transmitted into the stationary pipe 50, and the pressure is gradually reduced by a plurality of spaced baffles 59—59 provided in this pipe. The overflow that continuously escapes beyond the baffles 59—59 may collect in a trough 60, from which it may cascade to the overflow trough 51, and thence flow to a drain pipe 61.

An annular member 62 mounted within the entrance end of the stationary pipe 50 is provided with a tapered entrance portion 63 leading to an axial bore 64, which has a diameter only slightly larger than that of the covered conductor 17. The annular member 62 may support the covered conductor at this point without danger of injuring the plastic sheath 16, since by the time the covered conductor has advanced to this point its sheath is hard and relatively cool. The temperature of the sheath will have been reduced from about 350° F. to about 150° F. or less. The structure associated with the pipe 50 serves as a fluid pressure seal for the exit end of the tube 18.

By maintaining a body of cooling fluid at the exit end of the die 15 in this manner, the hot sheath 16 of the covered conductor 17 may be effectively cooled as soon as it issues from the die. The covered conductor 17 may be advanced through the fluid, and by the time the conductor reaches the exit end of the tube 18, its sheath 16 will be sufficiently cool and hard to allow it to be physically contacted without danger of damaging its shape or surface.

If any gases are released when the hot plastic compound issues from the extrusion die, the relatively high pressure of the cooling fluid prevents any tendency of such gases to form expanded bubbles in the plastic sheath, by halting the growth of such bubbles at their inception. At the same time, heating the exit end of the die prevents the cooling fluid from chilling the die to a temperature at which smooth extrusion cannot be obtained.

In Fig. 4 there is illustrated an embodiment of the apparatus in which the heating unit is positioned in the cold water instead of being separated therefrom by means of a sleeve. A conductive core 110 may be advanced through an extruder 113 having a core tube 114 for axially guiding the core 110 through a die 115. A mass of plastic material, such as a polyvinyl chloride compound, may be heated and then be forced through the die 115 with the advancing core 110 to form a concentric sheath 116 of insulation on the core. The product which continuously issues from the exit end of the extrusion die 115 is a sheathed conductor 117.

In this embodiment of the apparatus the heating unit for the exit end of the die comprises a plurality of cylindrical cartridges 120—120 spaced equidistantly about the sheathed conductor 117 and parallel thereto. The cartridges contain coils of wire (not shown) that may be electrically heated. An annular plate 122 positioned in abutting contact with the exit end of the die 115 is provided with a plurality of cavities 123—123 designed to receive and support the ends of the cartridges 120—120 close to the exit end of the die.

A second annular plate 124 is provided with a plurality of cavities 125—125 for receiving and supporting the opposite ends of the cartridges 120—120. A coupling 129 abuts the plate 124, and a plurality of bolts 130—130 extend through the coupling 129 and the plate 124 to secure these elements to the extruder 113. An adapter 131 (partially shown) threadedly engages the coupling 129, so as to provide communication with an elongated tube (not shown) which is identical with the tube 18 employed in the first embodiment of the apparatus.

Although only two cartridges 120—120 are illustrated, it may be found desirable to employ four or more of such cartridges equidistantly spaced about the sheathed conductor 117. These cartridges extend longitudinally through a chamber 132, which may be filled with cold water under pressure supplied from the elongated cooling tube that is joined to the adapter 131. As the sheathed conductor 117 is continuously advanced through a central aperture 134 formed in the plate 122, the cold water in the chamber 132 may contact a portion of the face of the exit end of the die 115, but the heated cartridges 120—120 prevent the die from being chilled to a temperature at which smooth extrusion cannot be obtained. This embodiment of the apparatus is identical in construction and in operation with the first embodiment of the apparatus, except for the specific manner in which the heating unit is arranged.

The apparatus described herein is effective to produce extruded articles that are free from such defects as bubbles, deformation, and coarse or marred surfaces. Although the invention has been described with particular reference to the production of insulated conductors, it is manifest that the invention may be advantageously employed in the production of plastic strips, tapes, tubes, or continuous plastic articles of any configuration.

What is claimed is:

1. Apparatus for extruding and cooling articles composed of plastic compounds, which comprises an extrusion die, means for continuously forcing a hot plastic compound through the die to shape the compound into an elongated article, an elongated tube coupled to the exit end of the die, means for filling the tube with a cooling fluid under pressure so that an article issuing from the die may be advanced directly into and through the fluid in the tube, means for quickly uncoupling the tube from the die, and an annular heating unit abutting the exit end of the die and spaced concentrically from the article issuing from the die, said heating unit serving to prevent the fluid from cooling the die to a temperature at which smooth extrusion cannot be obtained.

2. Apparatus for extruding and cooling articles composed of plastic compounds, which comprises an extrusion die, means for forcing a continuously plastic compound through the die to shape the compound into an elongated article of indefinite length, a tubular sleeve abutting the exit end of the die and concentrically spaced from an article issuing from the die, an annular heating unit spaced concentrically from the sleeve and abutting the exit end of the die, an elongated tube coupled to the exit end of the sleeve so that an article issuing from the die may be advanced successively through the sleeve and the tube, and means for introducing a cooling fluid under pressure into the tube to fill the tube and the sleeve so that the fluid contacts the exit end of the die within the sleeve, said heating unit serving to prevent the fluid in the sleeve from cooling the die to a temperature at which smooth extrusion cannot be obtained.

3. Apparatus for extruding insulating sheaths onto filamentary, conductive cores, which comprises an extrusion die, means for continuously advancing such a core through the die, means for continuously forcing a hot plastic compound through the die to form the compound into a sheath upon the moving core, a tubular sleeve abutting the exit end of the die and concentrically spaced from the sheathed core issuing from the die, an annular heating unit spaced concentrically around the exterior of the sleeve and abutting the exit end of the die, an elongated tube having one end adjacent to the exit end of the sleeve, an adapter coupling said adjacent end of the tube to the sleeve so that the sheathed core issuing from the die may be advanced successively through the sleeve, the adapter and the tube, means for quickly detaching the tube from the adapter, a fluid pressure seal mounted at the opposite end of the tube, and means for introducing a cooling fluid under pressure into the tube to fill the tube, the adapter and the sleeve so that the fluid contacts the exit end of the die within the sleeve, said heating unit serving to prevent the fluid in the sleeve from cooling the die to a temperature at which smooth extrusion cannot be obtained.

4. Apparatus for extruding insulating sheaths onto filamentary, conductive cores, which comprises an extrusion die, means for continuously advancing such a core axially through the die, an extruder for continuously forcing a hot plastic compound through the die to form the compound into a sheath of plastic insulation on the advancing core, a tubular sleeve abutting the exit end of the die and concentrically spaced about the sheathed core issuing from the die, an annular heating unit spaced about the sleeve and abutting the exit end of the die, an elongated tube mounted adjacent to the sleeve so that the sheathed core issuing from the die may be advanced successively through the sleeve and the tube, a quickly detachable clamp for coupling the entrance end of the tube to the sleeve, a fluid pressure seal mounted adjacent to the exit end of the tube, a quickly detachable clamp for coupling the exit end of the tube to the fluid pressure seal, and a supply pipe communicating with the tube for introducing cold water under pressure to fill the tube and the sleeve whereby the cold water contacts the exit end of the die within the sleeve, said heating unit serving to prevent the water in the sleeve from cooling the die to a temperature at which smooth extrusion cannot be obtained.

References Cited in the file of this patent

UNITED STATES PATENTS

| | | |
|---|---|---|
| 1,370,800 | Egerton | Mar. 8, 1921 |
| 2,035,247 | Royle | Mar. 24, 1936 |
| 2,151,476 | Kimble et al. | Mar. 21, 1939 |
| 2,513,802 | Jones | July 4, 1950 |
| 2,530,262 | Nelson | Nov. 14, 1950 |
| 2,540,497 | Stiegler | Feb. 6, 1951 |
| 2,558,730 | Cresswell | July 3, 1951 |
| 2,581,232 | Berggren | Jan. 1, 1952 |

FOREIGN PATENTS

| | | |
|---|---|---|
| 609,158 | Great Britain | Sept. 27, 1948 |
| 428,728 | Italy | Dec. 29, 1947 |

UNITED STATES PATENT OFFICE
CERTIFICATE OF CORRECTION

Patent No. 2,832,993                            May 6, 1958

Thomas K. Cox

It is hereby certified that error appears in the printed specification of the above numbered patent requiring correction and that the said Letters Patent should read as corrected below.

Column 5, line 7, for "forcing a continuously plastic compound" read -- continuously forcing a hot plastic compound --.

Signed and sealed this 21st day of October 1958.

(SEAL)

Attest:

KARL H. AXLINE                                    ROBERT C. WATSON

Attesting Officer                                Commissioner of Patents